Patented May 18, 1954

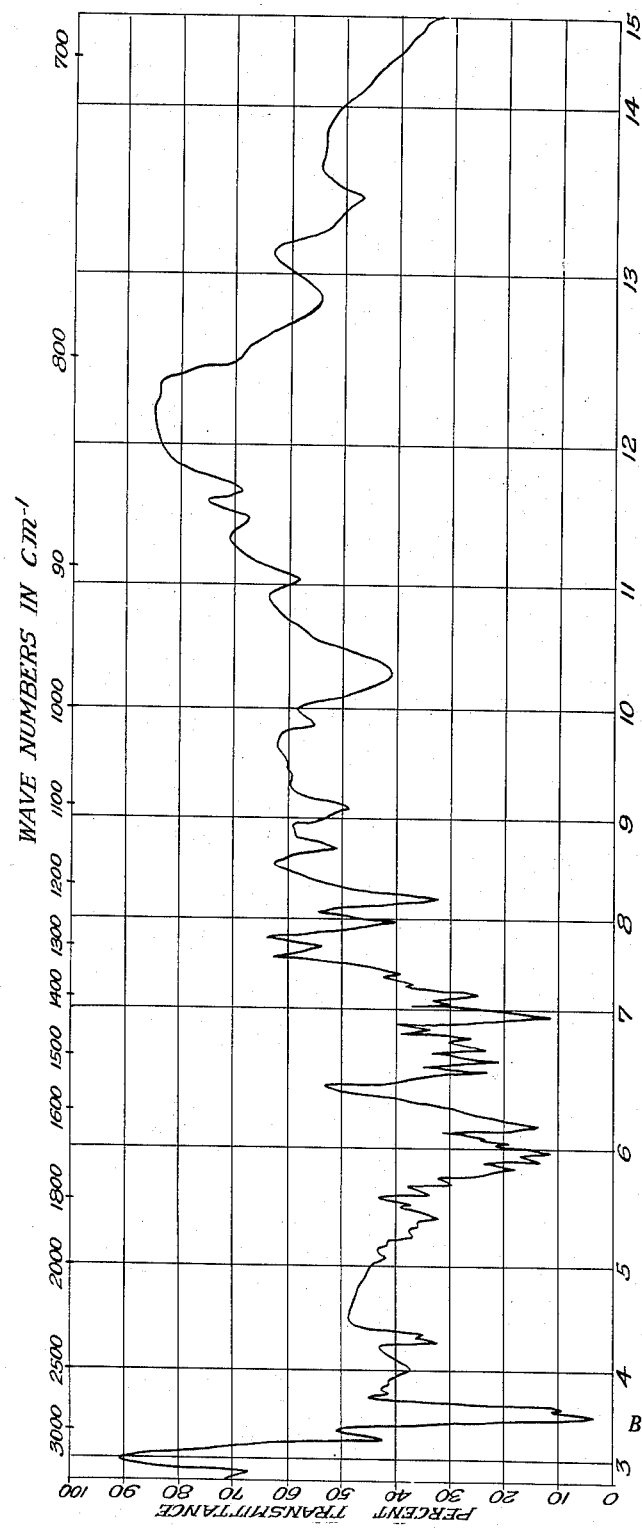
INFRARED SPECTRUM OF COMPOSITION OF MATTER
Inventors:
Walton E. Grundy
Alma L. Whitman
John C. Sylvester
Jay R. Schenck
Anthony F. DeRose
BY Albert E. Knauf
Atty.

2,678,929

UNITED STATES PATENT OFFICE 2,678,929

4-THIAZOLIDONE-2-n-CAPROIC ACID AND SALTS AND METHOD OF PREPARING

Walton E. Grundy, Waukegan, Alma L. Whitman, North Chicago, John C. Sylvester and Jay R. Schenck, Waukegan, and Anthony F. De Rose, Chicago, Ill., assignors to Abbott Laboratories, Chicago, Ill., a corporation of Illinois Application October 19, 1950, Serial No. 190,972

11 Claims. (Cl. 260—306.7)

The present invention relates to biochemical compositions and more particularly to a new antimicrobial agent and the process of preparing the same.

It has been known for some time that antimicrobial agent substances may be produced by certain species or strains of micro-organisms in various types of nutrient mediums. Well known examples are the formation of the penicillins by the cultivation or fermentation of *Penicillium notatum*, the formation of streptomyin by a strain of *Streptomyces griseus*, and more recently the formation of aureomycin by a strain of *Streptomyces aureofaciens*.

The organism producing the antimicrobial agent of the present invention is a strain of a species of the genus Streptomyces, which we call *Streptomyces virginiae*, following the key of Bergey's "Manual of Determinative Bacteriology" 6th edition. A culture of the said strain of the species of the genus *Streptomyces virginiae* is retained as a part of the permanent culture collection of the Northern Regional Research Laboratory of the United States Department of Agriculture, Peoria, Illinois, has been assigned number "NRRL B–1446" by said laboratory and is identical with that used to produce the antibiotic agent of the present invention. Its characteristics when grown on various media are as follows:

*Tryptone, beef extract, yeast extract, dextrose agar.*—Heavy white mycelium sparse grey spores, and producing a brown water-soluble pigment which diffuses into the agar.

*Peptone, beef extract, dextrose, sodium chloride agar.*—Light grey substratal mycelium, sparse light grey aerial mycelium, yellow brown water-soluble pigment.

*Oatmeal agar.*—Luxuriant growth, heavy lavender colored sporulation, yellow soluble pigment.

*Potato plug.*—Luxuriant growth spreading over entire plug, plug slowly darkened with brown pigment, heavy sporulation, pale lavender in color.

*Plain agar.*—Moderate growth, white substratal mycelium, sparse grey sporulation.

*Calcium malate agar.*—Light lavender sporulation turning grey lavender, complete hydrolysis of the malate.

*Dextrose asparagin agar.*—Thin growth, glossy white substratal mycelium turning dull white.

*Nutrient gelatin.*—Light brown pigmentation, very slow liquefaction.

*Kligler's iron agar.*—Luxuriant light brown moist growth, hydrogen sulfide formed.

*Litmus milk.*—Very alkaline without coagulation, no digestion apparent in 14 days.

*Starch agar.*—Hydrolysis of starch.

*Nitrate agar.*—Test for nitrite accumulation was negative.

The following carbon sources have been found to support growth: glucose, mannose, galactose, maltose, starch, gylcerol, sodium acetate and sodium citrate. Xylose, mannose, mannitol, sodium potassium tartrate, calcium lactate, lactose, sucrose, and sorbitol are carbon containing compounds that were not utilized or very poorly utilized as carbon sources. The following nitrogen sources were found to support growth: sodium nitrate, diammonium hydrogen phosphate, urea, asparagine and arginine. Tryptophane and tyrosine synthetic agars gave little or no growth above controls.

Sporulation of the culture occurs readily on a variety of media. The heaviest sporulation was observed on oatmeal agar, potato plug, calcium malate agar, starch, sodium acetate, sodium nitrate and arginine synthetic agars. The sporulating mycelium is grey lavender in color. Spores are produced in abundance by fragmentation of the aerial mycelium. The spores are coccoid to oval in shape. The mycelium is characterized by monopodial branching, numerous thin short branches extending from the main thick hypha and the absence of spirals.

In liquid medium incubated on a continuous rotary shaker at 24–26° C. the organisms grow as small pellets or irregular granules and produce a dark brown water-soluble pigment. Under suitable conditions a water-soluble antimicrobial agent is produced which inhibits micro-organisms in the same manner as is characteristic of the agar plate cultures. Yields of antimicrobial agent up to 320 dilution units are obtained when assayed with an agar dilution procedure employing *Mycobacterium tuberculosis* A. T. C. C. 607 as the test organism. The antimicrobial agent may also be assayed by a liquid medium dilution procedure which gives potencies four to eight fold the agar dilution assay figures.

Since the antimicrobial agent is readily diffusible, a paper-disc plate method of assay was employed. The crystalline antimicrobial agent at an assigned potency of 1,000 units per milligram was employed as the standard.

The following examples illustrate methods of producing the antibiotic product of the present invention:

Example I

A nutrient medium containing

| | | |
|---|---|---|
| Soybean oil meal | grams | 15 |
| Dextrose | do | 15 |
| Sodium chloride | do | 5 |
| Calcium carbonate | do | 1 |
| Distilled water | ml | 1000 | is dispensed in a 150 ml. volumes in 500 ml.

Erlenmeyer flasks. The flasks are plugged with cotton and sterilized in an autoclave at 250° F. for 30 minutes. After cooling the flasks to room temperature each flask is inoculated with 1 ml. of a spore suspension of the strain of the *Streptomyces virginiae*. The spore suspension is obtained by suspending the spores from an agar slant in 3–5 ml. of sterile water. The flasks are placed on a rotary shaker operating at 160–200 R. P. M. with a 2¼" stroke at a temperature of 24–26° C. After 48 hours 6 ml. of the culture is transferred to flasks of fresh medium of the same composition. These flasks are incubated in the same manner for 48 hours.

A nutrient medium of the following composition

| | | |
|---|---|---|
| Corn steep (liquid weight) | grams | 10 |
| Peptone | do | 5 |
| Dextrose | do | 15 |
| Calcium carbonate | do | 1 |
| Tap water | ml | 1000 | adjusted to pH 6.6–7.0 with sodium hydroxide is distributed in 150 ml. volumes in one quart glass jars with a gauze ventilated top. The jars are sterilized in the autoclave at 250° F. for 30 minutes. After cooling each jar is inoculated with 6 ml. of the second 48-hour culture described above. The jars are placed on the rotary shaker and incubated at 24–26° C. Beginning on the third day of incubation samples are withdrawn daily for assay of the antimicrobial agent activity. The antimicrobial agent activity is measured in terms of *Mycobacterium tuberculosis* A. T. C. C. 607 agar dilution units. The results are shown in the following table:

| Days Incubation | Units per ml. Antimicrobial Agent Activity |
|---|---|
| 3 | 12 |
| 4 | 40 |
| 5 | 80 |
| 6 | 120 |
| 7 | 120 |

*Example II*

A 12 liter batch of media of the following composition

| | | |
|---|---|---|
| Corn steep | grams | 10 |
| Peptone | do | 5 |
| Dextrose | do | 15 |
| Calcium carbonate | do | 1 |
| Tap water q. s. | ml | 1000 |
| Sodium carbonate to pH 6.0. | | | contained in a fermentation tank was inoculated with 500 ml. of vegetative culture of the strain of *Streptomyces virginiae* prepared as described above. The medium was continuously agitated and aerated while the temperature was maintained at 26° C. After 66 hours the medium contained 160 units of activity per ml. as determined by assay against *Mycobacterium tuberculosis* 607.

The antimicrobial agent produced as described above may be isolated from the fermented beer by the general methods available for isolation of organic acids. The following outline is illustrative:

1. Filtration of the fermented liquor to remove mycelial growth and other insoluble material;
2. Adsorption of the active principle on activated charcoal;
3. Elution from the activated charcoal by alcohol and acid (e. g., sulfuric or hydrochloric acid);
4. Evaporation of the alcohol after neutralization of the acid;
5. Acidification and extraction with butanol;
6. Chromatography on buffered silica gel of the butanol solution;
7. Extraction of the active chromatogram fractions into water with sodium hydroxide and back into butanol after acidification;
8. Concentration of the active solutions by evaporation. Cooling of the resulting concentrates causes the active antimicrobial agent substance to separate in crystalline form. Colored impurities may be removed by washing the crystals with cold butanol and chloroform.

Advantage may also be taken of the fact that the antimicrobial agent is acidic and can be adsorbed on certain anion exchange resins and eluted therefrom by means of strong acids, bases or salt solutions. The antimicrobial agent may also be chromatographed on other inorganic adsorbents such as magnesium silicate. The product may be recovered as a salt i. e. instead of forming the sodium salt, alkali metal salts may be produced.

The following detailed example illustrates a method of obtaining the antimicrobial agent product in crystalline form:

*Example III*

About 10.5 liters of whole fermented beer obtained as described above is filtered at its natural pH 7–7.5 (preferably with a diatomaceous filter-aid) to remove insoluble material. The resulting clarified beer (usually about 8–9 liters) is next slurried, e. g., by mechanical agitation, with 165 grams of activated charcoal, e. g., Darco G60, for about 1 to 2 hours. This mixture containing 2% carbon is then filtered and the resulting carbon cake with adsorbed antimicrobial agent washed with water and finally pressed to eliminate as much water as possible. The spent beer along with the washings are substantially free from activity and are discarded.

The carbon cake is next eluted three times using a total of about 3 liters of ethyl alcohol containing sufficient 10 to 20% sulfuric acid to provide the slurry with a pH of 2. The eluates are combined, adjusted to a pH of 4–8 with 6 N sodium hydroxide and concentrated under vacuum with low heat (30° C.) to a minimum of aqueous volume (i. e., about 1 liter).

The aqueous concentrate obtained from the above operation is next adjusted to pH 2 with 10 to 20% sulfuric acid and extracted twice with ⅓ and ⅙ volumes of n-butanol based on the volume of the aqueous concentrate. A third extraction using about ⅙ volume of n-butanol may also be employed if desired. The combined butanol extracts are adjusted to pH 8.5 to 10 with 6 N sodium hydroxide and one volume of benzene added. The resulting mixture is then extracted three times with water, sufficient water being used to provide a final combined aqueous extract of about 500–600 ml. The resulting extract was then extracted three times with n-butanol at pH 2 using sulfuric acid as described above. Extractions with 750 ml., 200 ml. and 200 ml. volumes of n-butanol to provide a combined final butanol extract of about 1.2 liters have been found satisfactory.

A silica gel column (25 cm. long with a 5.5 cm. diameter) was prepared with 300 grams of silica gel buffered with 200 ml. of about 1.5 molar potassium phosphate of pH 8 to 8.5. The n-butanol extract obtained as above was passed through the column to give one dark brown pigment band about 7 cm. from the top. On developing or eluting the column with n-butanol saturated with water, the band moved slightly with some diffusion. The pigment band was found inactive on assay and other column cuts assayed less than 10% of total activity. The eluate collected was two times the original volume of the n-butanol extract passed through the column. The eluate recovered from the column was next extracted with water at pH 8.5 to 10 using 6 N sodium hydroxide and 1 volume of benzene as described above. Sufficient water was used to give a combined aqueous extract of about 460 ml. This extract was then concentrated by evaporation under vacuum as described above to about 86 ml.

The aqueous concentrate obtained as described above was reextracted three times into n-butanol at pH 2 using 10 to 20% sulfuric acid in accordance with the extraction procedure described above. The combined n-butanol extract was concentrated under partial vacuum to 30 to 40 ml. and allowed to stand in the cold at about 3° C. Crystals of the antimicrobial agent formed and were separated from the concentrate. Upon concentration of the mother liquor to about 5–10 ml., a second crop of crystals of the desired antimicrobial agent was obtained.

The antimicrobial agent product of the present invention has the indicated empirical formula of $C_9H_{15}O_3NS$ with a molecular weight of 217. The structural formula has been determined to be

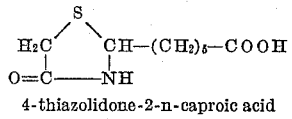

4-thiazolidone-2-n-caproic acid

In crystalline form it is obtained as colorless needles with a melting point of 135–137° C. On recrystallization from acetone and alcohol the melting point is raised to 137–139° In ethanol solution it has a specific rotation of $[\alpha]_D = -60.5°$. It is insoluble in water and chloroform but is soluble in low molecular weight alcohols, e. g., methanol and ethanol. It is also soluble in alkali metal hydroxide, e. g., sodium hydroxide, aqueous solutions to form salts thereof, and is characterized by one acidic group with a pH of approximately 5.8, but has no titratable basic group. The product is stable in neutral solutions but is decomposed by boiling with acids and bases. Up to the present time investigations have shown the product to have no characteristic ultra violet absorption spectrum.

The characteristic absorption bands, single beam, infrared spectrometer, in the infrared of a suspension obtained by milling the crystalline product in mineral oil are shown in Fig. 1. Among these are the following frequencies expressed in reciprocal centimeters:

Cm.$^{-1}$

| | | |
|---|---|---|
| 745 | 972 | 1305 |
| 780 | 1014 | 1355 |
| 799 | 1106 | 1650 |
| 857 | 1148 | 1692 |
| 873 | 1220 | 2500 |
| 908 | 1256 | 3155 |
| | 1300 | |

The antimicrobial agent of the present invention has been found to inhibit the growth of some micro-organism including: Mycobacterium tuberculoisis ATCC 607; Mycobacterium phlei ATCC 355.

Others may readily adapt the invention for use under varying conditions of service, by employing one or more of the novel features disclosed, or equivalents thereof. As at present advised with respect to the apparent scope of our invention, we desire to claim the following subject matter.

We claim:

1. A compound selected from the group consisting of 4-thiazolidone-2-n-caproic acid, the alkali metal salts of the said acid, and the salts of the said acid formed by reacting the said acid with a base.

2. 4-thiazolidone-2-n-caproic acid.

3. Alkali salts of 4-thiazolidone-2-n-caproic acid.

4. Sodium 4-thiazolidone-2-n-caproate.

5. Process for producing 4-thiazolidone-2-n-caproic acid which comprises, cultivating under submerged aerobic conditions a strain of Streptomyces virginiae in an aqueous nutrient medium containing fermentable carbonaceous and nitrogenous compositions utilizable by the said organism for the production of the said acid at a pH of about 6–7 and a temperature of about 24–26° C. until a substantial amount of the said acid is produced.

6. Process according to claim 5 in which the nutrient medium contains soybean oil meal and dextrose.

7. Process according to claim 5 in which the nutrient medium contains corn steep, peptone, and dextrose.

8. Process for producing 4-thiazolidone-2-n-caproic acid which comprises, cultivating under submerged aerobic conditions a strain of Streptomyces virginiae in an aqueous nutrient medium containing fermentable carbonaceous and nitrogenous compositions utilizable by the said organism for the production of the said acid at a pH of about 6–7 and a temperature of about 24–26° C. until a substantial amount of the said acid is produced, and recovery of the said acid from the fermentation medium.

9. Process according to claim 8 in which the recovery of the 4-thiazolidone-2-n-caproic acid includes the step of adsorption on activated carbon.

10. Process according to claim 8 in which the recovery includes the steps of filtering the fermentation medium to remove the insoluble material, adsorbing the active principle on activated charcoal, elution of the charcoal with acidified alcohol, evaporation of the alcohol, acidification of the resulting aqueous concentrate, extraction of the acidic concentrate with n-butanol, adsorption of the active principle on an inert inorganic adsorbent, elution of the active principle therefrom, and recovery of the same from the resulting concentration.

11. Process according to claim 8 in which the recovery includes the steps of filtering the fermentation medium to remove the insoluble matter, adsorbing the active principle in the clarified fermentation medium on activated charcoal, elution of the charcoal with acidified ethanol at a pH of about 2, evaporating the alcohol at a pH of about 4–8 under reduced pressure at a temperature of about 30° C., extraction of the resulting aqueous concentrate with n-butanol at a pH of about 2, adsorbing the active principle in the butanol extract on silica gel, elution of the silica gel with n-butanol saturated with water, adding benzene to the resulting eluate adjusted to pH 8.5 to 10 with sodium hydroxide, extracting the resulting alkaline mixture with water, extracting the resulting aqueous extract with n-butanol at a pH of about 2, and recovering the active principle precipitate therefrom.

References Cited in the file of this patent

UNITED STATES PATENTS

| Number | Name | Date |
|---|---|---|
| 2,482,055 | Duggar | Feb. 11, 1948 |
| 2,516,080 | Sobin et al. | July 18, 1950 |
| 2,516,682 | Donovick et al. | July 25, 1950 |

OTHER REFERENCES

Swart et al., Arch. Biochem., 24, Nov. 1949, "Neomycin," pp. 93, 100, 101.

Science News Letter for March 3, 1951, p. 130.

Baron, Handbook of Antibiotics, pp. 8 and 9, Reinhold Pub. Corp., N. Y.

Grundy et al., "Actithiazic Acid," Antibiotics and Chemotherapy, vol. 2, Aug. 1952, pp. 399–408.